United States Patent
Suzuki et al.

(10) Patent No.: US 12,198,449 B2
(45) Date of Patent: Jan. 14, 2025

(54) DRIVING ASSISTANCE APPARATUS, COMPUTER PROGRAM, AND RECORDING MEDIUM STORING COMPUTER PROGRAM

(71) Applicant: SUBARU CORPORATION, Tokyo (JP)

(72) Inventors: Mika Suzuki, Tokyo (JP); Fumiya Sato, Tokyo (JP); Tomohiro Abe, Tokyo (JP); Hiroki Marumo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/248,993

(22) PCT Filed: Dec. 15, 2021

(86) PCT No.: PCT/JP2021/046297
§ 371 (c)(1),
(2) Date: Apr. 13, 2023

(87) PCT Pub. No.: WO2023/112212
PCT Pub. Date: Jun. 22, 2023

(65) Prior Publication Data
US 2024/0378903 A1  Nov. 14, 2024

(51) Int. Cl.
*G06V 20/59* (2022.01)
*B60K 28/06* (2006.01)
(Continued)

(52) U.S. Cl.
CPC ............ *G06V 20/597* (2022.01); *B60K 28/06* (2013.01); *B60W 50/14* (2013.01);
(Continued)

(58) Field of Classification Search
CPC .... G06V 20/597; G06V 40/172; B60K 28/06; B60W 50/14; G01C 21/3415; H04W 4/46
See application file for complete search history.

(56) References Cited

U.S. PATENT DOCUMENTS

2013/0018549 A1* 1/2013 Kobana ................. B60K 28/06
701/41
2016/0304089 A1* 10/2016 Miura ................... B60W 10/18
(Continued)

FOREIGN PATENT DOCUMENTS

JP  2001-331900 A  11/2001
JP  2008-84004 A  4/2008
(Continued)

OTHER PUBLICATIONS

International Search Report and Written Opinion issued in the International PCT Application No. PCT/JP2021/046297 dated Feb. 15, 2022 (7 Pages).

Primary Examiner — Ryan W Sherwin
(74) Attorney, Agent, or Firm — Rimon P.C.

(57) ABSTRACT

A driving assistance apparatus configured to assist driving of a vehicle includes one or more processors and one or more memories communicably coupled to the one or more processors. The one or more processors are configured to execute a process including determining whether the vehicle is in a situation in which the vehicle is obstructing passage of a following vehicle; that the vehicle is in the situation, determining whether a driver of the vehicle is aware of the situation; upon determining that the driver is aware of the situation, determining whether the driver is able to determine a driving operation for avoiding the situation; and, upon not determining that the driver is able to determine the driving operation, setting an assistance operation for avoid- (Continued)

ing the situation, based on consciousness of the driver and a width of a road on which the vehicle is traveling.

7 Claims, 8 Drawing Sheets

(51) Int. Cl.
    *B60W 50/14*     (2020.01)
    *G01C 21/34*     (2006.01)
    *G06V 40/16*     (2022.01)
    *H04W 4/46*     (2018.01)

(52) U.S. Cl.
    CPC ....... *G01C 21/3415* (2013.01); *G06V 40/172* (2022.01); *H04W 4/46* (2018.02)

(56) References Cited

U.S. PATENT DOCUMENTS

| | | | |
|---|---|---|---|
| 2018/0334161 A1 | 11/2018 | Mizuno et al. | |
| 2019/0135291 A1* | 5/2019 | Sim | B60W 10/188 |
| 2020/0057487 A1* | 2/2020 | Sicconi | G06F 3/011 |
| 2020/0238975 A1 | 7/2020 | Mizuno et al. | |
| 2021/0182609 A1* | 6/2021 | Arar | G06V 20/597 |
| 2021/0229658 A1* | 7/2021 | Tsuji | B60W 60/0016 |

FOREIGN PATENT DOCUMENTS

| | | |
|---|---|---|
| JP | 2012-58827 A | 3/2012 |
| JP | 2018-195202 A | 12/2018 |
| JP | 2019-117624 A | 7/2019 |
| JP | 2019-119371 A | 7/2019 |
| JP | 2021-51655 A | 4/2021 |

\* cited by examiner

| DRIVING SKILL | ROAD WIDTH | CONSCIOUSNESS LEVEL |
|---|---|---|
| CONSCIOUSNESS LEVEL TO START ASSISTANCE | | |
| LOW | 4 m OR LESS | 70 |
| MEDIUM | 4 m OR LESS | 60 |
| HIGH | 4 m OR LESS | 50 |
| LOW | 5 m OR LESS | 56 |
| MEDIUM | 5 m OR LESS | 48 |
| HIGH | 5 m OR LESS | 40 |
| LOW | 6 m OR LESS | 45 |
| MEDIUM | 6 m OR LESS | 38 |
| HIGH | 6 m OR LESS | 32 |

DRIVING ASSISTANCE APPARATUS, COMPUTER PROGRAM, AND RECORDING MEDIUM STORING COMPUTER PROGRAM

CROSS-REFERENCE TO RELATED APPLICATIONS

This application is the U.S. National Phase under 35 U.S.C. § 371 of International Application No. PCT/JP2021/046297, filed on Dec. 15, 2021.

TECHNICAL FIELD

The disclosure relates to a driving assistance apparatus, a computer program, and a recording medium storing the computer program for assisting driving of a vehicle in a situation in which the vehicle is obstructing passage of a following vehicle.

BACKGROUND ART

In the related art, various apparatuses have been proposed for assisting driving of a vehicle in a situation in which the vehicle is obstructing traveling of a vehicle (hereafter also referred to as a "following vehicle") behind the vehicle. For example, PTL 1 proposes an anti-tailgating system for deterring tailgating of a following vehicle. PTL 1 discloses an anti-tailgating system including tailgating detection means and tailgating deterring means. The tailgating detection means detects a first vehicle being tailgated by a second vehicle. The tailgating deterring means deters tailgating when tailgating of the second vehicle is detected by the tailgating detection means. When tailgating is detected, the anti-tailgating system allows the first vehicle to change the lane or pull over to the shoulder of the road, or transmits an instruction signal for deterring tailgating to the second vehicle.

PTL 2 proposes a yielding action assistance system that assists a vehicle to quickly yield to an approaching emergency vehicle. PTL 2 discloses a yielding action assistance system including a detection unit, an information acquisition unit, a target pull-over point calculation unit, and a notification unit. The detection unit detects an approach of an emergency vehicle. The information acquisition unit acquires information about other vehicles and information about a road. The target pull-over point calculation unit determines a target pull-over point for the vehicle to yield to the emergency vehicle based on the information about the other vehicles and the information about the road. Further, the target pull-over point calculation unit sequentially updates the target pull-over point based on at least the information about the other vehicles. The notification unit notifies a driver who drives the vehicle of the target pull-over point.

CITATION LIST

Patent Literature

PTL 1: Japanese Unexamined Patent Application Publication No. 2019-119371
PTL 2: Japanese Unexamined Patent Application Publication No. 2018-195202

SUMMARY OF INVENTION

Technical Problem

Each of the assistance apparatuses disclosed in PTLs 1 and 2 is configured to execute predetermined control regardless of whether the driver of a vehicle is aware of a situation in which the vehicle is obstructing a following vehicle. If the driver is not aware of a situation in which the driver's vehicle is obstructing a following vehicle, the driver may be made aware of the situation to overcome the situation. However, for example, if the driver is aware of the situation, some drivers may be able to take an appropriate driving action for avoiding the situation. Such drivers may be annoyed by processing such as driving control or notification performed by the assistance apparatus.

The disclosure has been made in view of the issues described above, and an object of the disclosure is to provide a driving assistance apparatus, a computer program, and a recording medium storing the computer program that can execute an appropriate assistance process in accordance with whether a driver of a vehicle is aware of a situation in which the vehicle is obstructing a following vehicle.

Solution to Problem

To address the problems described above, an aspect of the disclosure provides a driving assistance apparatus configured to assist driving of a vehicle. The driving assistance apparatus includes one or more processors, and one or more memories communicably coupled to the one or more processors. The one or more processors are configured to execute a process including: determining whether the vehicle is in a situation in which the vehicle is obstructing passage of a following vehicle; when it is determined that the vehicle is in the situation in which the vehicle is obstructing passage of the following vehicle, determining whether a driver of the vehicle is aware of the situation; when it is determined that the driver is aware of the situation, determining whether the driver is able to determine a driving operation for avoiding the situation; and, when it is not determined that the driver is able to determine the driving operation for avoiding the situation, setting a target pull-over point for avoiding the situation, based on consciousness of the driver and a width of a road on which the vehicle is traveling.

To address the problems described above, another aspect of the disclosure provides a driving assistance apparatus configured to assist driving of a vehicle. The driving assistance apparatus includes a traffic situation determination unit configured to determine whether the vehicle is in a situation in which the vehicle is obstructing passage of a following vehicle; a driver condition determination unit configured to, when it is determined that the vehicle is in the situation in which the vehicle is obstructing passage of the following vehicle, determine whether a driver of the vehicle is aware of the situation, and to, when it is determined that when the driver is aware of the situation, determine whether the driver is able to determine a driving operation for avoiding the situation; and an assistance processing unit configured to, when it is not determined that the driver is able to determine the driving operation for avoiding the situation, set a target pull-over point for avoiding the situation, based on consciousness of the driver and a width of a road on which the vehicle is traveling.

To address the problems described above, another aspect of the disclosure provides a non-transitory recording medium storing a computer program to be applied to a driving assistance apparatus for assisting driving of a vehicle. The computer program causes one or more processors to execute a process including: determining whether the vehicle is in a situation in which the vehicle is obstructing passage of a following vehicle; when it is determined that the vehicle is in the situation in which the vehicle is obstructing passage of the following vehicle, determining whether a driver of the vehicle is aware of the situation; when it is determined that the driver is aware of the situation, determining whether the driver is able to determine a driving operation for avoiding the situation; and, when it is not determined that the driver is able to determine the driving operation for avoiding the situation, setting a target pull-over point for avoiding the situation, based on consciousness of the driver and a width of a road on which the vehicle is traveling.

Advantageous Effects of Invention

As described above, according to the disclosure, an appropriate assistance process can be executed in accordance with whether a driver of a vehicle is aware of a situation in which the vehicle is obstructing a following vehicle.

DESCRIPTION OF EMBODIMENTS

Figure 1:
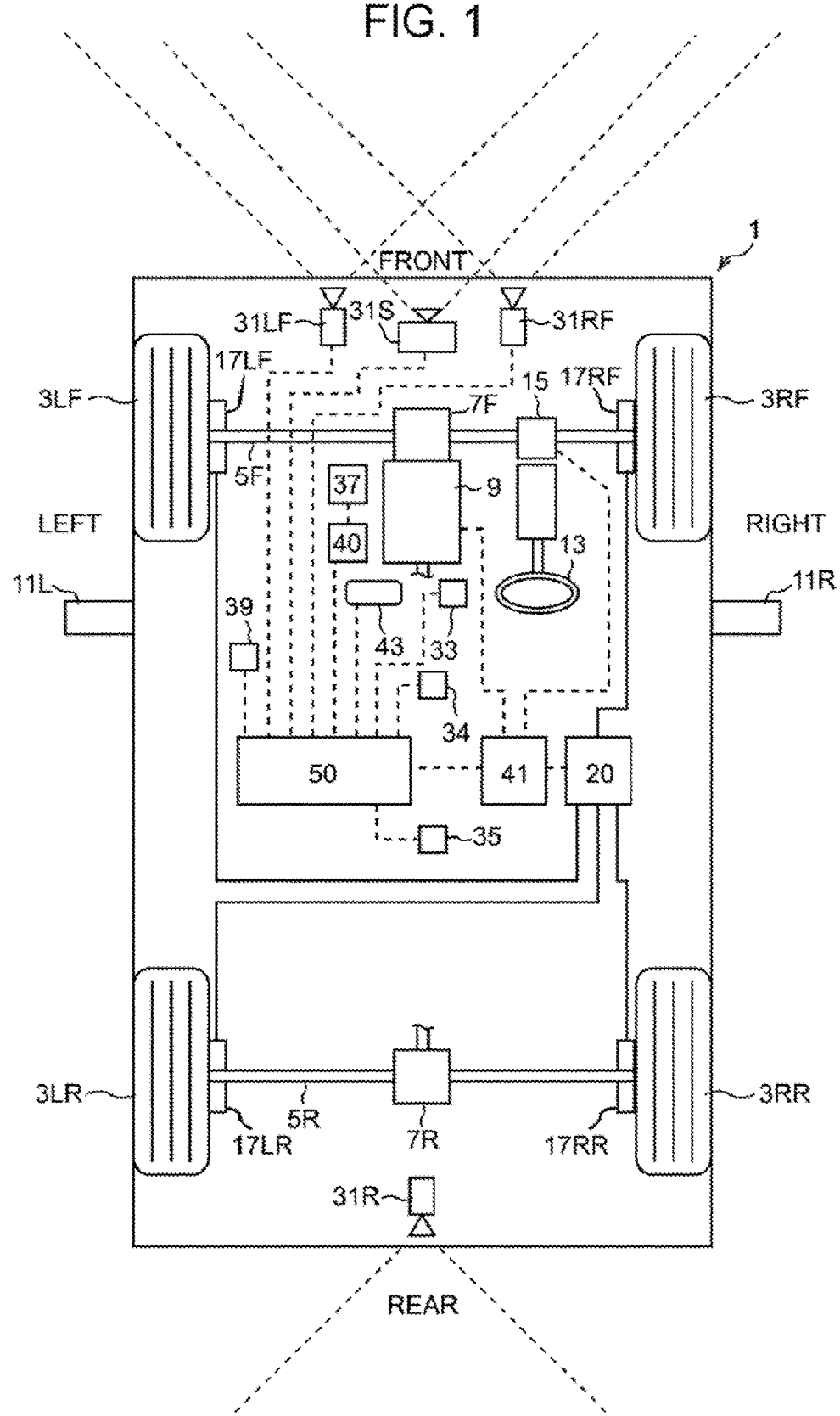
FIG. 1 is a schematic diagram illustrating an example configuration of a vehicle including a driving assistance apparatus according to an embodiment of the disclosure.

Hereinafter, a preferred embodiment of the disclosure will be described in detail with reference to the accompanying drawings. In the specification and the drawings, components having substantially the same functions and configurations are denoted by the same reference numerals, and redundant description thereof will be omitted.

<1. Overall Configuration of Vehicle>

First, an example overall configuration of a vehicle to which a driving assistance apparatus according to an embodiment of the disclosure can be applied will be described.

FIG. 1 is a schematic diagram illustrating an example configuration of a vehicle 1 including a driving assistance apparatus 50 according to this embodiment. The vehicle 1 illustrated in FIG. 1 is configured as a four-wheel drive vehicle. The four-wheel drive vehicle transmits a driving torque output from a drive power source 9 for generating a vehicle driving torque to a left front wheel 3LF, a right front wheel 3RF, a left rear wheel 3LR, and a right rear wheel 3RR. The left front wheel 3LF, the right front wheel 3RF, the left rear wheel 3LR, and the right rear wheel 3RR are hereafter collectively referred to as "wheels 3" unless otherwise specified. The drive power source 9 may be an internal combustion engine such as a gasoline engine or a diesel engine, or may be a drive motor. The drive power source 9 may include both an internal combustion engine and a drive motor.

The vehicle 1 may be an electric vehicle provided with two drive motors, for example, a front-wheel drive motor and a rear-wheel drive motor, or may be an electric vehicle provided with drive motors each corresponding to one of the wheels 3. In an example, the vehicle 1 is an electric vehicle or a hybrid electric vehicle. In this example, the vehicle 1 is equipped with a secondary battery that stores electric power to be supplied to a drive motor, and a generator such as a motor or a fuel cell that generates electric power to be charged in the battery.

The vehicle 1 includes the drive power source 9, an electric steering device 15, and a brake fluid pressure control unit 20 as devices used for driving control of the vehicle 1. The drive power source 9 outputs a driving torque to be transmitted to a front-wheel drive shaft 5F and a rear-wheel drive shaft 5R via a transmission (not illustrated), a front-wheel differential mechanism 7F, and a rear-wheel differential mechanism 7R. Driving of the drive power source 9 and the transmission is controlled by a vehicle control device 41 including one or more electronic control units (ECUs).

The electric steering device 15 is disposed on the front-wheel drive shaft 5F. The electric steering device 15 includes an electric motor and a gear mechanism (not illustrated). The electric steering device 15 is controlled by the vehicle control device 41 to adjust steering angles of the left front wheel 3LF and the right front wheel 3RF. During manual driving, the vehicle control device 41 controls the electric steering device 15 based on the steering angle of a steering wheel 13 by the driver. During automatic driving, the vehicle control device 41 controls the electric steering device 15 based on a target steering angle set by the driving assistance apparatus 50.

The vehicle 1 includes a brake system that is configured as a hydraulic brake system. The brake fluid pressure control unit 20 adjusts the pressure of oil to be supplied to brake calipers 17LF, 17RF, 17LR, and 17RR (hereafter collectively referred to as "brake calipers 17" unless otherwise specified) and generates a braking force. The brake calipers 17LF, 17RF, 17LR, and 17RR are disposed on the left front, right front, left rear, and right rear drive wheels 3LF, 3RF, 3LR, and 3RR, respectively. Driving of the brake fluid pressure control unit 20 is controlled by the vehicle control device 41. In a case where the vehicle 1 is an electric vehicle or a hybrid electric vehicle, the brake fluid pressure control unit 20 is used in combination with a regenerative brake based on a drive motor.

The vehicle control device 41 includes one or more electronic control devices that control driving of the drive power source 9 that outputs a driving torque of the vehicle 1, the electric steering device 15 that controls a steering angle of the steering wheel 13 or steered wheels, and the brake fluid pressure control unit 20 that controls a braking force of the vehicle 1. The vehicle control device 41 may have a function of controlling driving of the transmission that changes the speed of the output that is output from the drive power source 9 and transmits the output to the wheels 3. The vehicle control device 41 is configured such that information transmitted from the driving assistance apparatus 50 can be acquired. Further, the vehicle control device 41 is configured such that automatic driving control of the vehicle 1 can be executed. During manual driving of the vehicle 1, the vehicle control device 41 acquires information on an amount of operation generated by driving by the driver, and controls driving of the drive power source 9 that outputs a driving torque of the vehicle 1, the electric steering device 15 that controls a steering angle of the steering wheel 13 or steered wheels, and the brake fluid pressure control unit 20 that controls a braking force of the vehicle 1.

The vehicle 1 further includes front cameras 31LF and 31RF, a rear camera 31R, a LiDAR (Light Detection And Ranging) device 31S, an in-vehicle camera 33, a biometric sensor 34, a vehicle state sensor 35, a GPS (Global Positioning System) sensor 37, a vehicle-to-vehicle communication unit 39, a navigation system 40, and an HMI (Human Machine Interface) 43.

The front cameras 31LF and 31RF, the rear camera 31R, and the LiDAR device 31S (hereafter collectively referred to as "surrounding environment sensor 31 unless otherwise specified) constitute a surrounding environment sensor for acquiring information on the surrounding environment of the vehicle 1. The front cameras 31LF and 31RF and the rear camera 31R capture images of scenes in front of and behind the vehicle 1, respectively, to generate image data. The front cameras 31LF and 31RF and the rear camera 31R each include an imaging element such as a CCD (Charge-Coupled Device) or CMOS (Complementary Metal-Oxide-Semiconductor) imaging element, and each transmit the generated image data to the driving assistance apparatus 50.

In the vehicle 1 illustrated in FIG. 1, the front cameras 31LF and 31RF are configured as a stereo camera including a pair of left and right cameras, and the rear camera 31R is configured as a so-called monocular camera. The vehicle 1 may include a front camera and a rear camera, each of which is a stereo camera or a monocular camera. The vehicle 1 may also include a camera disposed on a side view mirror 11L or 11R to capture an image of a left rear view or a right rear view, in addition to the front cameras 31LF and 31RF and the rear camera 31R.

The LiDAR device 31S transmits an optical wave and receives a reflected wave of the optical wave to detect an object and a distance to the object on the basis of the time from transmission of the optical wave to reception of the reflected wave. The LiDAR device 31S transmits detection data to the driving assistance apparatus 50. The vehicle 1 may include, in place of or in addition to the LiDAR device 31S, one or more of a radar sensor such as a millimeter wave radar sensor and an ultrasonic sensor as a surrounding environment sensor for acquiring information on the surrounding environment.

The in-vehicle camera 33 includes one or more sensors that detect information on the driver of the vehicle 1. The in-vehicle camera 33 includes an imaging element such as a CCD or CMOS imaging element. The in-vehicle camera 33 captures an image of the inside of the vehicle 1 to generate image data. The in-vehicle camera 33 transmits the generated image data to the driving assistance apparatus 50. In this embodiment, the in-vehicle camera 33 is disposed such that an image of the driver of the vehicle 1 can be captured. One in-vehicle camera 33 may be installed, or multiple in-vehicle cameras 33 may be installed.

The biometric sensor 34 detects biometric information of the driver and transmits detection data to the driving assistance apparatus 50. For example, the biometric sensor 34 may be a radio-wave Doppler sensor for detecting the heart rate of the driver, or may be a non-wearable pulse sensor for detecting the pulse of the driver. Alternatively, the biometric sensor 34 may be a set of electrodes embedded in the steering wheel 13 to measure the heart rate or electrocardiogram of the driver. Alternatively, the biometric sensor 34 may be a pressure measuring instrument embedded in the driver's seat to measure a seating pressure distribution of the driver seated in the seat. Alternatively, the biometric sensor 34 may be a displacement sensor that detects a change in the position of a seat belt to measure the heart rate or respiration of the driver. Alternatively, the biometric sensor 34 may be a TOF (Time of Flight) sensor for detecting information on the position of the driver. Alternatively, the biometric sensor 34 may be a thermography sensor for measuring the surface temperature of the skin of the driver.

Alternatively, the biometric sensor 34 may be a wearable sensor to be worn by the driver to detect the biometric information of the driver. The wearable biometric sensor 34 may be, for example, a wristwatch-type wearable device or a head-mounted or arm-wearable device. These wearable devices may have a function of detecting biometric information such as the heart rate, pulse, blood pressure, and body temperature of the driver. The wearable biometric sensor 34 may be coupled to the driving assistance apparatus 50 directly or via a communication means such as a CAN (Controller Area Network) or a LIN (Local Inter Net). Alternatively, the wearable biometric sensor 34 may be configured to be capable of communicating with the driving assistance apparatus 50 via a wireless communication means such as Bluetooth (registered trademark), NFC (Near Field Communication), wifi (wireless fidelity), or a wireless LAN (Local Area Network).

The vehicle state sensor 35 includes one or more sensors that detect an operation state and a behavior of the vehicle 1. The vehicle state sensor 35 includes at least one of a steering angle sensor, an accelerator position sensor, a brake stroke sensor, a brake pressure sensor, or an engine rotation speed sensor, for example, and detects an operation state of the vehicle 1, such as a steering angle of the steering wheel 13 or steered wheels, an accelerator opening degree, an amount of brake operation, or an engine rotation speed. The vehicle state sensor 35 further includes at least one of a vehicle speed sensor, an acceleration sensor, or an angular velocity sensor, for example, and detects a vehicle behavior such as a vehicle speed, a longitudinal acceleration, a lateral acceleration, or a yaw rate. The vehicle state sensor 35 includes a sensor for detecting an operation of a direction indicator, and detects an operation state of the direction indicator. The vehicle state sensor 35 transmits a sensor signal including detected information to the driving assistance apparatus 50.

The vehicle-to-vehicle communication unit 39 is an interface for performing communication with moving vehicles (hereafter also referred to as "other vehicles") around the vehicle 1 (the "subject vehicle").

The navigation system 40 is a known navigation system that sets a travel route to a destination set by an occupant and notifies the driver of the travel route. The navigation system 40 is coupled to the GPS sensor 37. The navigation system 40 receives satellite signals from GPS satellites via the GPS sensor 37 and acquires position information of the vehicle 1 on map data. In place of the GPS sensor 37, an antenna that receives a satellite signal from another satellite system that locates the position of the vehicle 1 may be used.

The HMI 43 is driven by the driving assistance apparatus 50 and presents various kinds of information to the driver by means such as image display or audio output. The HMI 43 includes, for example, a display device disposed in an instrument panel and a speaker disposed in the vehicle 1. The display device may have a function of a display device of the navigation system 40. The HMI 43 may also include a head-up display that displays an image on the front window of the vehicle 1.

<2. Driving Assistance Apparatus>

Next, the driving assistance apparatus 50 according to this embodiment will be described in detail.

2-1. Example Configuration

Figure 2:
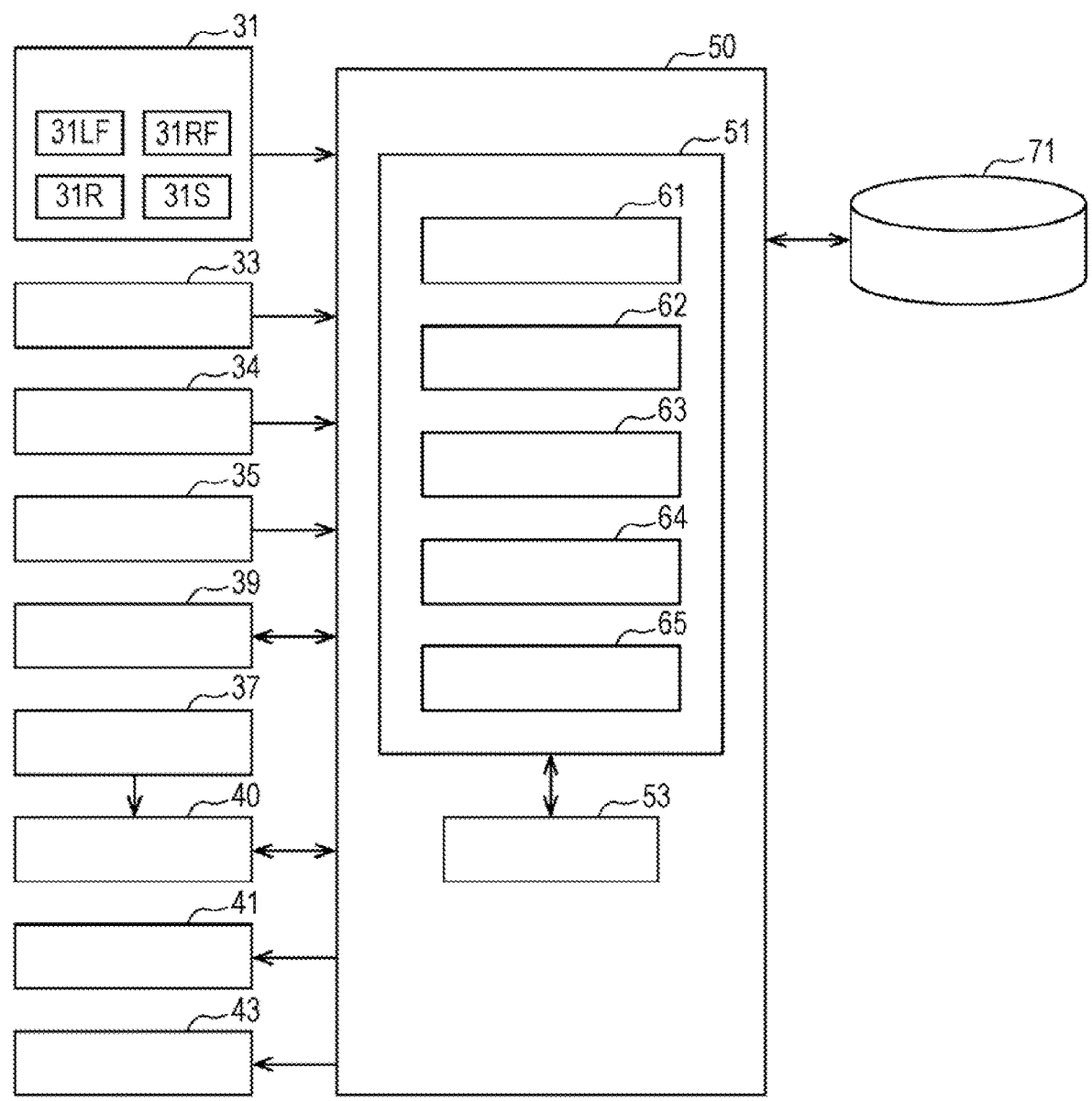
FIG. 2 is a block diagram illustrating an example configuration of the driving assistance apparatus according to the embodiment.

FIG. 2 is a block diagram illustrating an example configuration of the driving assistance apparatus 50 according to this embodiment.

The driving assistance apparatus 50 is coupled to the surrounding environment sensor 31, the in-vehicle camera 33, the biometric sensor 34, and the vehicle state sensor 35 via a dedicated line or a communication means such as a CAN (Controller Area Network) or a LIN (Local Inter Net). The driving assistance apparatus 50 is also coupled to the vehicle-to-vehicle communication unit 39, the navigation system 40, the vehicle control device 41, and the HMI 43 via a dedicated line or a communication means such as a CAN or a LIN. The driving assistance apparatus 50 is not limited to the electronic control device mounted on the vehicle 1, and may be a terminal apparatus such as a smartphone or a wearable device.

The driving assistance apparatus 50 includes a controller 51 and a memory 53. The controller 51 includes one or more processors such as a CPU (Central Processing Unit). Part or all of the controller 51 may be implemented as updatable firmware or the like, or may be a program module or the like executed by a command from the CPU or the like. The memory 53 is constituted by a recording medium (memory) such as a RAM (Random Access Memory) or a ROM (Read Only Memory). However, the number and type of memories 53 are not limited. The memory 53 stores a computer program to be executed by the controller 51 and information such as various parameters used for arithmetic processing, detection data, and arithmetic results.

2-2. Driver Database

The driving assistance apparatus 50 is communicably coupled to driver databases 71. Each of the driver databases 71 is constituted by a storage element such as a RAM or by an updatable recording medium such as an HDD (Hard Disk Drive), a CD (Compact Disk), a DVD (Digital Versatile Disk), an SSD (Solid State Drive), a USB flash, or a storage device. However, the type of the recording medium is not limited. One or all of the driver databases 71 may be mounted on the vehicle 1, or may be stored in a server capable of communicating with the driving assistance apparatus 50 via wireless communication means such as mobile communication.

The driver databases 71 are databases that store information about drivers. In this embodiment, the driver databases 71 store data of features extracted from face images of individual drivers and identification information associated with the data of the respective features. The identification information is not limited, and may be data composed of characters, numbers, or symbols, for example.

The driver databases 71 further store information on the driving skills of the individual drivers in association with the identification information of the drivers. The information on the driving skills may include, for example, data of driving operations acquired during previous manual driving by the individual drivers. Such information may be recorded data collected by control devices on board vehicles during driving of the vehicles by the respective drivers. The information on the driving skills may include information on questionnaire results collected from the respective drivers in advance. The information on the questionnaire results may include, for example, data of driving histories such as driving experience, driving frequency, accidents, and traffic violations. The information on the questionnaire results may also include data of attitudes toward driving (thoughts on driving), such as a vehicle speed, an inter-vehicle distance, and a degree of acceleration/deceleration.

2-2. Functional Configuration of Controller

The controller 51 of the driving assistance apparatus 50 determines whether the vehicle (the "subject vehicle") 1 is in a situation in which the vehicle 1 is obstructing passage of a following vehicle (hereafter, also referred to as a "passage obstruction situation"). If the controller 51 determines that the vehicle 1 is in the passage obstruction situation, the controller 51 determines whether the driver of the vehicle 1 is aware of the passage obstruction situation. Further, the controller 51 executes a process including setting an assistance operation for avoiding the passage obstruction situation, based on whether the driver is aware of the passage obstruction situation.

As illustrated in FIG. 2, the controller 51 of the driving assistance apparatus 50 includes a driver determination unit 61, an acquisition unit 62, a traffic situation determination unit 63, a driver condition determination unit 64, and an assistance processing unit 65. Each of these units may be a function implemented by execution of a computer program by a processor such as a CPU. However, some or all of them may be implemented by an analog circuit. Hereinafter, the functions of the units of the controller 51 will be briefly described, and subsequently the processing operation of the controller 51 will be described in detail.

(Driver Determination Unit)

The driver determination unit 61 executes a process of identifying the driver of the vehicle 1 and determining the driving skill level of the driver with reference to the driver databases 71 based on the image data transmitted from the in-vehicle camera 33. The driver determination unit 61 may identify the driver of the vehicle 1 based on information input by the driver or the occupant via an input device such as a touch panel and determine the driving skill level of the driver.

(Acquisition Unit)

The acquisition unit 62 executes a process of acquiring various kinds of information on the traffic situation of the vehicle 1. In one example, the acquisition unit 62 acquires information on the traveling state of the vehicle 1 based on a detection signal transmitted from the vehicle state sensor 35, and acquires information on the surrounding environment of the vehicle 1 based on a detection signal transmitted from the surrounding environment sensor 31. Further, the acquisition unit 62 may acquire, from other vehicles that support vehicle-to-vehicle communication, position information and traveling state information of each vehicle. The acquisition unit 62 stores the acquired various kinds of information in the memory 53 as time-series data.

(Traffic Situation Determination Unit)

The traffic situation determination unit 63 determines the traffic situation around the vehicle 1 based on the information on the traveling state of the vehicle 1 and the information on the surrounding environment of the vehicle 1. In one example, the traffic situation determination unit 63 detects other vehicles traveling around the vehicle 1 based on the information on the surrounding environment of the vehicle 1. Further, the traffic situation determination unit 63 calculates information on the traveling states of the other vehicles and information on the relative position between the vehicle 1 and each of the other vehicles. The information on the traveling state of the other vehicles includes information on the vehicle speeds and accelerations/decelerations of the other vehicles, and the lighting state of the headlights of a following vehicle. The information on the relative position between the vehicle 1 and each of the other vehicles includes information on the position and relative speed of each of the other vehicles with respect to the vehicle 1, and the inter-vehicle distance between the vehicle 1 and each of the other vehicles.

Further, the traffic situation determination unit 63 executes a process of determining whether the vehicle 1 is in a situation in which the vehicle 1 is obstructing passage of a following vehicle, based on the information on the traveling state of the vehicle 1, the information on the surrounding environment of the vehicle 1, the information on the traveling states of the other vehicles, and the information on the relative position between the vehicle 1 and each of the other vehicles. The passage obstruction situation in which the vehicle 1 is obstructing passage of a following vehicle includes a situation in which the vehicle 1 is being tailgated by a following vehicle, a situation in which the vehicle 1 is obstructing an emergency vehicle approaching from behind, and a situation in which the vehicle 1 has caused traffic congestion behind the vehicle 1.

(Driver Condition Determination Unit)

If the traffic situation determination unit 63 determines that the vehicle 1 is in a situation in which the vehicle 1 is obstructing passage of a following vehicle, the driver condition determination unit 64 executes a process of determining whether the driver of the vehicle 1 is aware of the passage obstruction situation. The driver condition determination unit 64 determines whether the driver is aware of the passage obstruction situation, based on at least information on the line of sight of the driver. The driver condition determination unit 64 may further use consciousness information to determine whether the driver is aware of the passage obstruction situation.

The line of sight of the driver is detected based on image data generated by the in-vehicle camera 33. The line of sight of the driver is used to determine whether the driver directs his/her eyes to a rear view mirror or a side view mirror or to a pull-over space ahead of the vehicle 1. In a case where the driver directs his/her eyes to the rear view mirror or the side view mirror, it is determined that the driver understands the situation in which the vehicle 1 is being tailgated by the following vehicle. In a case where the driver directs his/her eyes to the pull-over space, it is determined that the driver is trying to move the vehicle 1 to the pull-over space. It is thus determined that the driver is aware of the situation in which the vehicle 1 is being tailgated by the following vehicle. The consciousness of the driver is calculated based on the detection signal of the biometric sensor 34 or the image data generated by the in-vehicle camera 33, and is used for estimating the concentration or fatigue level of the driver. In a case where the consciousness of the driver is low, it is considered that the ability of the driver to recognize the passage obstruction situation is low. Thus, the driver condition determination unit 64 may use the consciousness information to determine whether the driver is aware of the passage obstruction situation.

In this embodiment, furthermore, if the vehicle 1 is being tailgated, the driver condition determination unit 64 executes a process of determining whether the driver himself/herself is able to determine what kind of driving operation to perform to avoid the passage obstruction situation. In one example, the driver condition determination unit 64 uses information on at least one of the driving operation of the driver or the driving skill level of the driver to determine whether the driver himself/herself is able to determine what kind of driving operation to perform to avoid the passage obstruction situation. The driving operation of the driver is detected based on the detection signal of the vehicle state sensor 35, and is used for determining whether a driving operation for avoiding the passage obstruction situation is started. The driving skill level of the driver is calculated based on the data accumulated in the driver databases 71, and is used for estimating whether the driver can quickly perform an avoidance action.

(Assistance Processing Unit)

The assistance processing unit 65 executes a process of setting an assistance operation for avoiding the passage obstruction situation, based on whether the driver is aware of the passage obstruction situation. In this embodiment, if it is determined that the vehicle 1 is in a passage obstruction situation in which the vehicle 1 is being tailgated, the assistance processing unit 65 executes a process of setting an assistance operation for avoiding the passage obstruction situation, based on whether the driver is aware of the passage obstruction situation. For example, if the driver is not aware of the passage obstruction situation, the assistance processing unit 65 executes a recognition assistance process for making the driver aware of the passage obstruction situation. On the other hand, if the driver is aware of the passage obstruction situation, the assistance processing unit 65 executes a pull-over assistance process for assisting the driver in taking a pull-over action. In this embodiment, the assistance processing unit 65 is configured such that the recognition assistance process and the pull-over assistance process can be executed in accordance with the consciousness of the driver.

<3. Operation of Driving Assistance Apparatus>

Next, an example of a processing operation performed by the controller 51 of the driving assistance apparatus 50 according to this embodiment will be described in detail. In the following description, a situation in which the vehicle 1 is being tailgated by a following vehicle will be described as an example of the passage obstruction situation.

Figure 3:
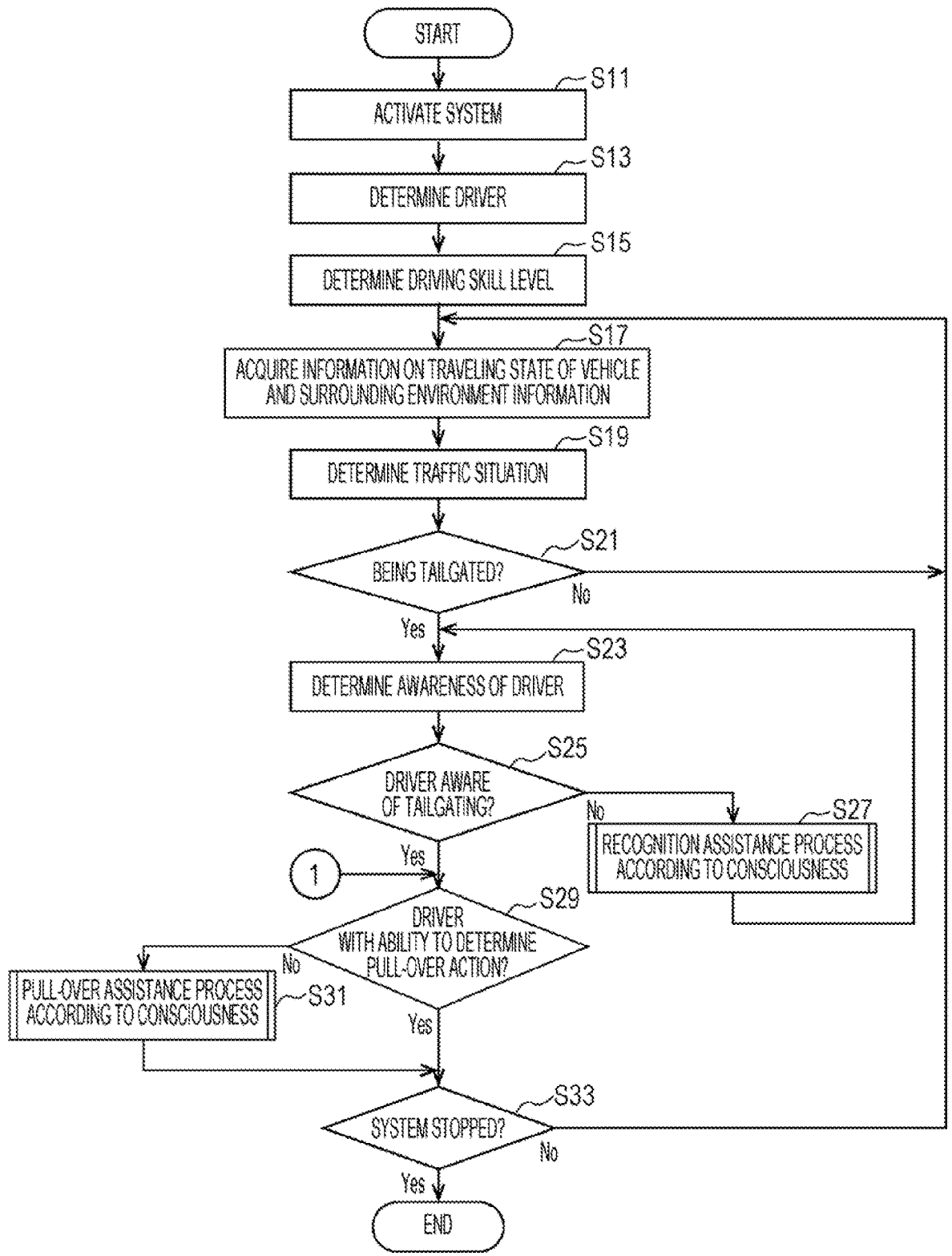
FIG. 3 is a flowchart illustrating a main routine of an avoidance assistance processing operation performed by the driving assistance apparatus according to the embodiment.

FIG. 3 is a flowchart illustrating a main routine of a process executed by the controller 51.

First, when an in-vehicle system including the driving assistance apparatus 50 is activated (step S11), the driver determination unit 61 of the controller 51 executes a process of identifying the driver of the vehicle 1 (step S13). For example, the driver determination unit 61 executes a process of recognizing the face of the driver seated in the driver's seat based on image data transmitted from the in-vehicle camera 33. Further, the driver determination unit 61 performs a process of extracting a feature from the recognized face of the driver, and determines whether information on a driver matching the extracted feature is stored in the driver databases 71. If the information on the driver matching the extracted feature is not stored in the driver databases 71, the driver determination unit 61 assigns identification information to each recognized driver. Then, the driver determination unit 61 stores the identification information in the driver databases 71 together with the data of the feature, and also stores the identification information in the memory 53. On the other hand, if the information on the driver matching the extracted feature is stored in the driver databases 71, the driver determination unit 61 stores identification information that identifies the detected driver in the memory 53.

Then, the driver determination unit 61 of the controller 51 determines the driving skill level of the driver (step S15). In one example, the driver determination unit 61 refers to the driver databases 71, reads information on the driving skill of the identified driver, and comprehensively determines the driving skill level. For example, the driver determination unit 61 standardizes each item of the stored information on the driving skill with an evaluation point of 0 to 10, and determines the driving skill level to be any one of "low", "medium", and "high" according to the average value. However, the method of determining the driving skill level is not limited.

Then, the acquisition unit 62 acquires information on the traveling state of the vehicle 1 and information on the surrounding environment (step S17). The information on the traveling state of the vehicle 1 includes at least information, detected by the vehicle state sensor 35, on the vehicle speed and acceleration/deceleration of the vehicle 1, a steering angle of the steering wheel or steered wheels, the lighting state of the direction indicator, and the lighting state of the hazard lights of the vehicle 1. The information on the surrounding environment includes information on other vehicles, a pedestrian, a cyclist, an obstacle, a lane, and the like, which are detected by the surrounding environment sensor 31, and information on the relative position between the vehicle 1 and each of the other vehicles, the pedestrian, or the like. The information on the relative position includes information on the direction, relative distance, and relative speed of each of the other vehicles or the like with respect to the vehicle 1. The acquisition unit 62 may also acquire information about other vehicles via vehicle-to-vehicle communication.

Then, the traffic situation determination unit 63 determines the traffic situation of the vehicle 1 based on the acquired information on the traveling state of the vehicle 1 and the acquired information on the surrounding environment (step S19). In one example, the traffic situation determination unit 63 determines the traveling position of the vehicle 1 based on the acquired information on the surrounding environment. Further, the traffic situation determination unit 63 executes a process of detecting a following vehicle based on the acquired information on the surrounding environment. If a following vehicle is detected, the traffic situation determination unit 63 calculates the traveling state of the following vehicle and the relative position between the vehicle 1 and the following vehicle. The information on the traveling state of the following vehicle includes information on the vehicle speed and acceleration/deceleration of the following vehicle, and the lighting state of the headlights of the following vehicle. The information on the relative position between the vehicle 1 and the following vehicle includes information on the position and relative speed of the following vehicle with respect to the vehicle 1, and the inter-vehicle distance between the vehicle 1 and the following vehicle.

Further, the traffic situation determination unit 63 performs a process of determining whether the vehicle 1 is being tailgated by the following vehicle, based on the information on the traveling state of the vehicle 1, the information on the traveling state of the following vehicle, and the information on the relative position between the vehicle 1 and the following vehicle. The traffic situation determination unit 63 determines that the vehicle 1 is being tailgated by the following vehicle, for example, if the following vehicle repeats acceleration and deceleration when the inter-vehicle distance between the vehicle 1 and the following vehicle is within a predetermined range, if the vehicle 1 is continuously followed closely by the following vehicle for a predetermined time or more at an inter-vehicle distance that is within a preset range, if the following vehicle repeats flashing the headlights, or if the following vehicle keeps the headlights on high beam for a predetermined time or more. However, the method of determining whether the vehicle 1 is being tailgated is not limited to the example described above, and a known determination method may be used as appropriate.

Then, the traffic situation determination unit 63 determines whether the vehicle 1 is being tailgated by the following vehicle, based on the determination result of step S19 (step S21). If it is not determined that the vehicle 1 is being tailgated by the following vehicle (S21/No), the process returns to step S17. Then, the process of acquiring the information on the traveling state of the vehicle 1 and the information on the surrounding environment and the process of determining whether the vehicle 1 is being tailgated by the following vehicle are repeated. On the other hand, if it is determined that the vehicle 1 is being tailgated by the following vehicle (S21/Yes), the driver condition determination unit 64 executes a process of determining whether the driver of the vehicle 1 is aware of the passage obstruction situation in which the vehicle 1 is being tailgated by the following vehicle (step S23). For example, the driver condition determination unit 64 uses any one or a combination of determination criteria described below to determine whether the driver is aware of the passage obstruction situation.

First, the driver condition determination unit 64 may determine that the driver is aware of the passage obstruction situation if the time or frequency with which the driver directs his/her eyes to the rear view mirror or the side view mirror is equal to or greater than a preset threshold. The direction of the eyes of the driver can be determined based on the image data generated by the in-vehicle camera 33. Alternatively, the driver condition determination unit 64 may determine that the driver is aware of the passage obstruction situation in a case where the driver directs his/her eyes to a pull-over space ahead of the vehicle 1. The information on the pull-over space is determined based on, for example, detection signals transmitted from the front cameras 31LF and 31RF and the LiDAR device 31S. The determination may be made based on position information acquired from the navigation system 40.

The threshold for the determination based on the line of sight of the driver may be variable in accordance with the consciousness of the driver. For example, in a case where the concentration of the driver is low or the fatigue level of the driver is high, the driver may fail to accurately recognize the passage obstruction situation even in a case where the driver directs his/her eyes to the rear view mirror or the side view mirror. Accordingly, the driver condition determination unit 64 may adjust the threshold for the determination such that the driver is less likely to be determined to be aware of the passage obstruction situation if a consciousness level of the driver described below is lower. As a result, it is possible to increase the accuracy of determining whether the driver is aware that the vehicle 1 is being tailgated.

Then, the assistance processing unit 65 determines whether the driver of the vehicle 1 is aware of the passage obstruction situation, based on the determination result of step S23 (step S25). If it is not determined that the driver of the vehicle 1 is aware of the passage obstruction situation (S25/No), the assistance processing unit 65 executes the recognition assistance process according to the consciousness of the driver of the vehicle 1 (step S27).

Figure 4:
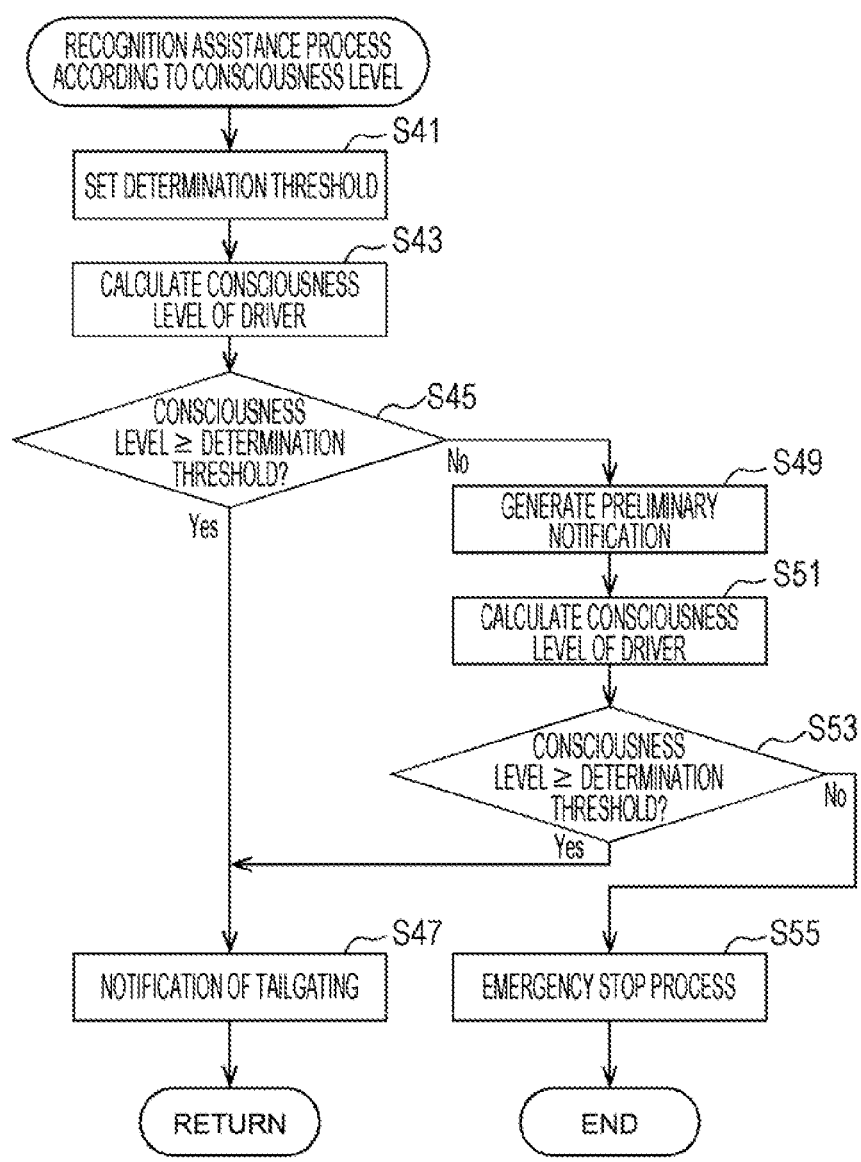
FIG. 4 is a flowchart illustrating a recognition assistance process performed by the driving assistance apparatus according to the embodiment.

FIG. 4 is a flowchart illustrating a routine of the recognition assistance process according to the consciousness of the driver.

First, the assistance processing unit 65 sets a determination threshold for the consciousness level (step S41). The determination threshold for the consciousness level is set for the following reason. In a case where the driver is in low consciousness condition, the driver may be distracted upon being suddenly notified of being tailgated. As a result, the behavior of the vehicle 1 may become unstable. Accordingly, the determination threshold for the consciousness level defines a lower limit of the consciousness level for performing the notification. Whether the driver is distracted by the notification may differ depending on the driving skill level of the driver. In this embodiment, the determination threshold for the consciousness level is set in accordance with the driving skill level of the driver. In addition, the narrower the width of the road on which the vehicle 1 is traveling is, the more unstable the behavior of the vehicle 1 becomes upon a sudden notification, making the vehicle 1 dangerous to drive. Accordingly, in this embodiment, the determination threshold for the consciousness level is set in accordance with the width of the road on which the vehicle 1 is traveling.

Figures 5, 6:
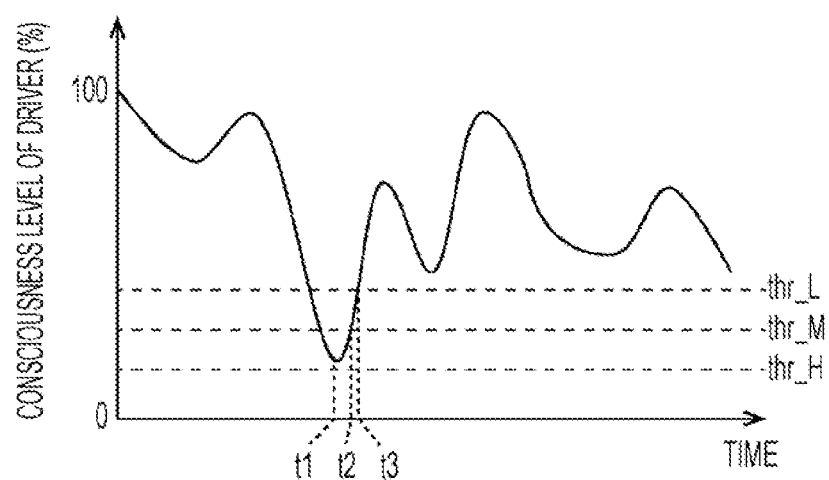
FIG. 5 is an explanatory diagram illustrating examples of a set determination threshold for a consciousness level according to the embodiment.
FIG. 6 is an explanatory diagram illustrating a difference in timing of notification due to a difference in driving skill level.

FIG. 5 is an explanatory diagram illustrating examples of the set determination threshold for the consciousness level of the driver. FIG. 5 illustrates examples of the determination threshold for the consciousness level set in accordance with the driving skill level of the driver and the width of a road on which the vehicle 1 is traveling. The determination threshold is set to a larger value if the driving skill level of the driver is lower and the width of the road is narrower. That is, if the driving skill level of the driver is lower, the driver is notified, at a higher consciousness level, of being tailgated. Further, if the width of the road is narrower, the driver is notified, at a higher consciousness level, of being tailgated.

The determination threshold for the consciousness level of the driver may be constant regardless of the driver. Alternatively, the determination threshold for the consciousness level of the driver may be set based on the consciousness level during normal driving. The consciousness level during normal driving is calculated while the driver is driving the vehicle 1 without being tailgated or without causing traffic congestion. For example, 70% of the consciousness level during normal driving may be set as the determination threshold. The determination threshold is set based on a normal consciousness level. This allows accurate determination of a reduction in each driver's consciousness in accordance with the consciousness level of the driver during driving. Accordingly, it is less likely that a notification process executed even though the driver is aware of the passage obstruction situation annoys the driver or reduces the reliability of the system.

Then, the driver condition determination unit 64 calculates the consciousness level indicating the level of consciousness of the driver (step S43). For example, the driver condition determination unit 64 estimates the concentration or fatigue level of the driver based on the detection signal transmitted from the biometric sensor 34, and calculates consciousness. In one example, the driver condition determination unit 64 may determine, based on the detection signal transmitted from the biometric sensor 34, that the driver is drowsy or has low concentration if the heart rate or pulse of the driver is lower than a preset drowsiness determination threshold and changes by a small amount. Alternatively, the driver condition determination unit 64 may determine, based on the detection signal transmitted from the biometric sensor 34, that the driver is in a poor physical condition if the body temperature of the driver is higher than a preset physical condition determination threshold. Alternatively, the driver condition determination unit 64 may obtain the degree of opening of the driver's eyes and the number or frequency of blinks, based on the image data generated by the in-vehicle camera 33, and determine the degree of drowsiness of the driver. In this embodiment, the driver condition determination unit 64 converts the estimated consciousness of the driver into a consciousness level of 0 to 100%, for example. The driver condition determination unit 64 calculates the consciousness level of the driver for each arithmetic processing cycle of the controller 51.

Then, the assistance processing unit 65 determines whether the consciousness level of the driver is equal to or higher than the determination threshold (step S45). If the consciousness level is equal to or higher than the determination threshold (S45/Yes), the assistance processing unit 65 executes a process of notifying the driver that the vehicle 1 is being tailgated by the following vehicle (step S47). For example, the assistance processing unit 65 outputs a command signal to the HMI 43 and performs notification by voice and/or display on a display screen. After executing the notification process for the driver, the assistance processing unit 65 returns to step S23 in FIG. 3.

On the other hand, if the consciousness level is less than the determination threshold (S45/No), the assistance processing unit 65 outputs a command signal to the HMI 43 or an acoustic device to generate a preliminary notification sound (step S49). The preliminary notification sound to be generated is a sound effect that does not include information indicating that the vehicle 1 is being tailgated. The preliminary notification sound is output for the purpose of increasing the low consciousness level of the driver. Instead of or in combination with the preliminary notification sound, preliminary notification with an LED light or the like turned on may be performed.

After generating the preliminary notification sound, in accordance with the procedure of step S43 and step S45, the assistance processing unit 65 calculates the consciousness level of the driver again and determines whether the consciousness level is equal to or higher than the determination threshold (step S51 to step S53). If the consciousness level is equal to or higher than the determination threshold (S53/Yes), the assistance processing unit 65 executes a process of notifying the driver that the vehicle 1 is being tailgated by the following vehicle (step S47). As a result, the driver is notified, at a consciousness level of equal to or higher than the predetermined level, of being tailgated. This can prevent the behavior of the vehicle 1 from becoming unstable due to a sudden notification. In addition, since the determination threshold is set in accordance with the driving skill level of the driver, the notification is performed at a timing according to the driving skill level of the driver without annoying the driver. After executing the notification process for the driver, the assistance processing unit 65 returns to step S23 in FIG. 3.

FIG. 6 is an explanatory diagram illustrating a difference in timing of notification due to a difference in driving skill level. In FIG. 6, the horizontal axis represents time, and the vertical axis represents the consciousness level of the driver. A determination threshold thr_L for a driver whose driving skill level is "low" is set to a larger value than a determination threshold thr_M for a driver whose driving skill level is "medium". The determination threshold thr_M of the driver whose driving skill level is "medium" is set to a larger value than a determination threshold thr_H for a driver whose driving skill level is "high".

It is assumed that the vehicle 1 starts to be tailgated at time t1. If the driving skill level of the driver is "high", the consciousness level of the driver exceeds the determination threshold thr_H at time t1. Thus, the assistance processing unit 65 notifies the driver that the vehicle 1 is being tailgated without generating the preliminary notification sound. If the driving skill level of the driver is "medium" or "low", in contrast, the consciousness level of the driver is lower than the determination threshold thr_M or thr_L at time t1. Thus, the assistance processing unit 65 does not perform the notification suddenly, but generates the preliminary notification sound to try to increase the consciousness level of the driver. If the driving skill level of the driver is "medium", the assistance processing unit 65 notifies the driver of tailgating at time t2 when the consciousness level of the driver reaches the determination threshold thr_M. If the driving skill level of the driver is "low", the assistance processing unit 65 notifies the driver of tailgating at time t3 when the consciousness level of the driver reaches the determination threshold thr_L. In this way, the notification is performed in accordance with the determination threshold set for each driving skill level of a driver, at a timing according to the driving skill level of the driver without annoying the driver.

On the other hand, if the consciousness level is less than the determination threshold (S53/No), the consciousness level of the driver does not increase even though the preliminary notification sound is generated, and a potential emergency may arise. Thus, the assistance processing unit 65 executes a process of bringing the vehicle 1 into an emergency stop (step S55). For example, the assistance processing unit 65 sets a pull-over space ahead of the vehicle 1. In addition, the assistance processing unit 65 sets the steering angle and deceleration of the vehicle 1 to automatically pull over the vehicle 1 to the pull-over space, and transmits information on the driving conditions to the vehicle control device 41. This makes it possible to safely park the vehicle 1 in the pull-over space, for example, when the driver is in a poor physical condition or in an unconscious state. In a case where the vehicle 1 is brought to an emergency stop, the controller 51 ends the assistance process.

After the preliminary notification sound is generated in step S49, the assistance processing unit 65 may proceed to the processing of step S51 after a predetermined time set in advance has elapsed to secure a time to increase the consciousness level of the driver. Alternatively, the assistance processing unit 65 may gradually increase the volume of the preliminary notification sound to be generated in step S49.

Referring back to FIG. 3, after the recognition assistance process of step S27 is executed, the process returns to step S23. Then, the process of determining the awareness of the driver is repeated. On the other hand, if it is determined in step S25 that the driver of the vehicle 1 is aware of the passage obstruction situation (S25/Yes), the assistance processing unit 65 determines whether the driver himself/ herself is able to determine how to perform the pull-over action (step S29). For example, the assistance processing unit 65 may determine that the driver himself/herself is able to determine how to perform the pull-over action if the driver is performing a driving operation for avoiding the passage obstruction situation.

Figure 7:
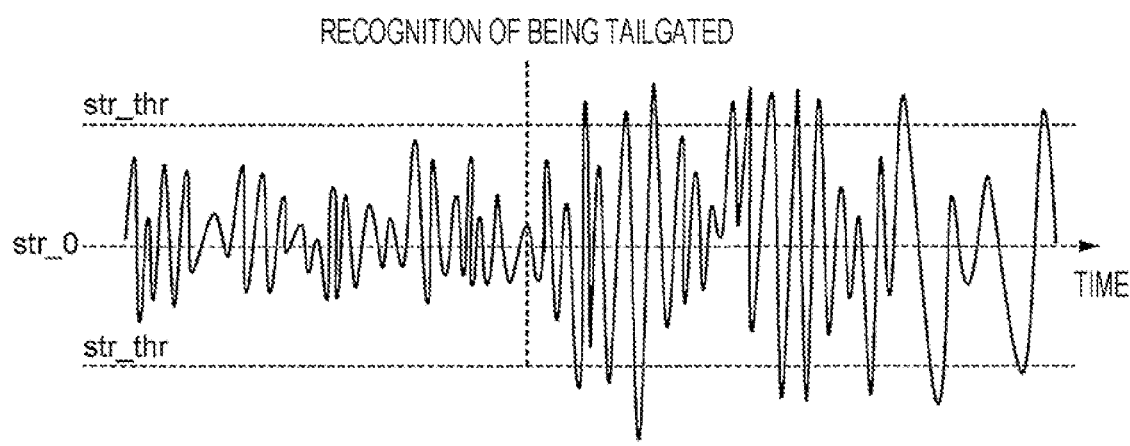
FIG. 7 is an explanatory diagram illustrating an example of determining, based on a steering angle, whether a driver of the vehicle is able to determine an avoidance action according to the embodiment.

For example, in a case where the driver operates the steering wheel to move the vehicle 1 over to the side of the road or in a case where the driver activates the hazard lights, it can be determined that the driver himself/herself is able to determine how to perform the pull-over action. However, if the steering angle of the steering wheel is excessively large, the driver may be distracted and in a state that makes normal driving impossible. Accordingly, as illustrated in FIG. 7, the assistance processing unit 65 learns data of steering angles of the steering wheel during driving of the vehicle 1 by the driver in a state in which the vehicle 1 is not being tailgated or does not cause traffic congestion, and sets, for example, an average value of the steering angles as a determination threshold str_thr. Upon input of a steering angle exceeding the determination threshold str_thr, the assistance processing unit 65 determines that the driver is not able to determine how to perform the pull-over action.

Figure 8:
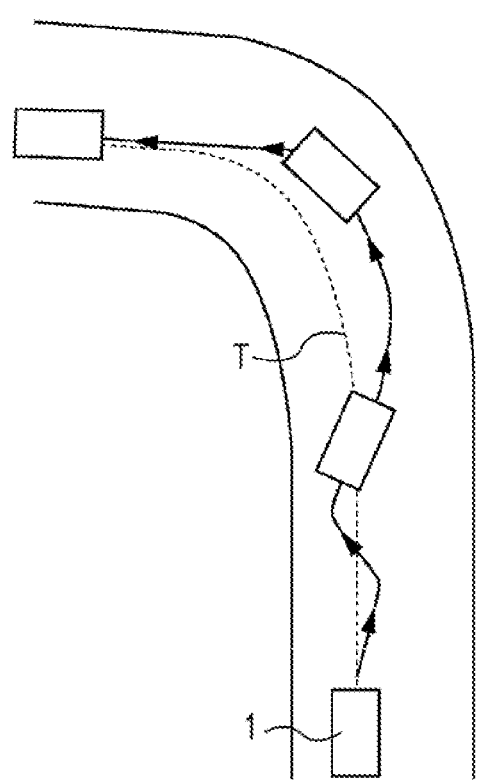
FIG. 8 is an explanatory diagram illustrating another example of determining, based on a steering angle, whether a driver of the vehicle is able to determine an avoidance action according to the embodiment.

Alternatively, it may be determined that the driver himself/herself is able to determine how to perform the pull-over action if the driver tries to change the lane, based on information on the steering angle and the lighting state of the direction indicator. Alternatively, it can be determined that the driver himself/herself is able to determine how to perform the pull-over action if the driver is decelerating the vehicle 1. Alternatively, it can be determined that the driver himself/herself is able to determine how to perform the pull-over action if the driver is accelerating the vehicle 1, based on information on the vehicle speed, the acceleration/ deceleration, or the amount of operation of the accelerator pedal. For example, if the driver accelerates the vehicle 1 from a state in which the vehicle speed of the vehicle 1 is lower than the legal speed limit, it may be determined that the driver himself/herself is able to determine how to perform the pull-over action. Alternatively, as illustrated in FIG. 8, if the vehicle 1 is traveling with a steering angle exceeding the curvature of the road or the vehicle 1 is traveling with a steering angle such that the vehicle 1 greatly deviates from a reference traveling line T set on the road, it may be determined that the driver himself/herself is not able to determine how to perform the pull-over action. The curvature of the road is obtained based on map data or image data transmitted from the in-vehicle camera 33.

The threshold for determining whether the driver/herself is able to determine how to perform the pull-over action may be variable in accordance with the driving skill level of the driver. For example, a driver with a low driving skill level may not know what kind of specific driving operation to perform even if the driver has an intention to perform a pull-over action. In this case, a setting is performed such that a driver with a lower driving skill level is more likely to be determined to be aware of the passage obstruction situation. This setting makes it possible to start assistance of the pull-over action as quickly as possible.

Even in a case where the driver is not performing a driving operation for avoiding the passage obstruction situation, the assistance processing unit 65 may determine that the driver himself/herself is able to determine how to perform the pull-over action if the driving skill level of the driver is high. However, if it is determined, based on the detection signal transmitted from the biometric sensor 34, that the heart rate or pulse of the driver is high, the assistance processing unit 65 may determine that the driver is not able to determine how to perform the pull-over action. Alternatively, if it is determined, using facial expression analysis based on the face image data of the driver transmitted from the in-vehicle camera 33, that the driver is distracted, the assistance processing unit 65 may determine that the driver is not able to determine how to perform the pull-over action.

If it is determined that the driver himself/herself is able to determine how to perform the pull-over action (S29/Yes), the assistance processing unit 65 determines that the driver himself/herself is able to perform the pull-over action. Then, the process proceeds to step S33. As a result, the execution of the pull-over assistance process is terminated. Thus, it is possible to prevent the driver from being annoyed by the pull-over assistance process that is executed even though the driver himself/herself is executing a driving operation for avoiding tailgating. It is also possible to prevent a reduction in the reliability of the system due to the execution of the pull-over assistance process. On the other hand, if it is not determined that the driver himself/herself is able to determine how to perform the pull-over action (S29/No), the assistance processing unit 65 executes a pull-over assistance process according to the consciousness of the driver of the vehicle 1 (step S31).

Figure 9:
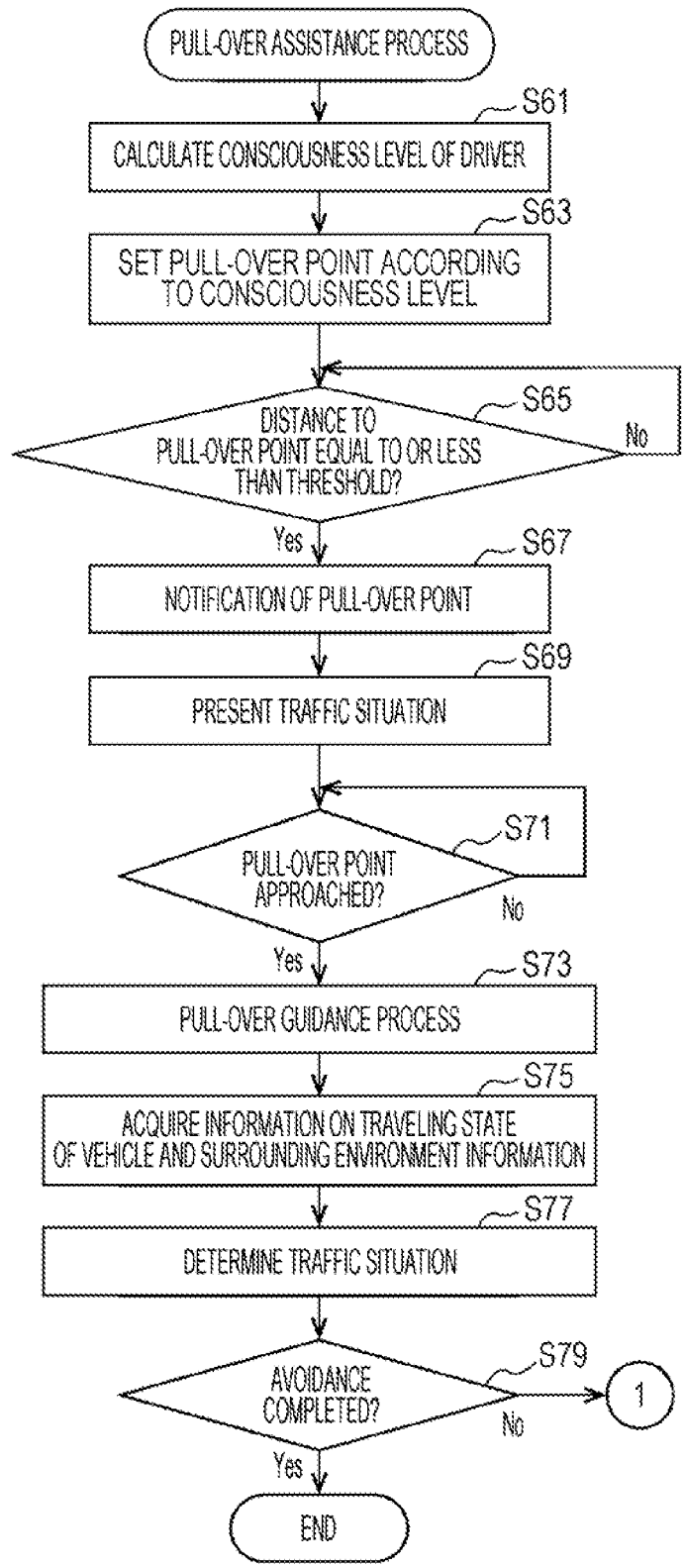
FIG. 9 is a flowchart illustrating a pull-over assistance process performed by the driving assistance apparatus according to the embodiment.

FIG. 9 is a flowchart illustrating a routine of the pull-over assistance process according to the consciousness of the driver.

First, the driver condition determination unit 64 calculates a consciousness level indicating the level of consciousness of the driver in a procedure similar to that in step S43 (step S61). Then, the assistance processing unit 65 sets a target pull-over point according to the consciousness level (step S63). For example, the assistance processing unit 65 uses the map data stored in the navigation system 40 and the information on the current position of the vehicle 1 to search for a target pull-over point in an area located ahead in the traveling direction of the vehicle 1 and having a width corresponding to the consciousness level. For example, if the consciousness level of the driver is higher, the driver may be able to move the vehicle 1 closer to the side of the road. In addition, the behavior of the vehicle 1 is less likely to become unstable even if a following vehicle overtaking the vehicle 1 passes closer to the vehicle 1. Accordingly, if the consciousness level of the driver is lower, the assistance processing unit 65 sets an area having a larger width as the target pull-over point. The assistance processing unit 65 continues the search until such a pull-over point is detected. Therefore, in a case where the consciousness level of the driver is low, the vehicle 1 can be overtaken by a following vehicle with a sufficient distance to the following vehicle passing alongside the vehicle 1.

Further, the assistance processing unit 65 may change the width of the road at the position to be set as the target pull-over point, in accordance with the driving skill level of the driver. In one example, depending on the difference in driving skill between drivers, a driving speed may be reduced during driving on an unfamiliar narrow road such as a new road. In this case, the driver with a high driving skill level is able to move the vehicle 1 closer to the side of the road and bring the vehicle 1 to a stop or slowdown to safely yield to a following vehicle. In contrast, the driver with a low driving skill level may fail to safely yield to a following vehicle on a narrow road while being mentally stressed by a following tailgater or traffic congestion occurring behind the vehicle 1 due to the low speed of the vehicle 1. Accordingly, the width of the road at the position to be set as the target pull-over point is preferably set to be larger for a driver with a lower driving skill level when driving skill levels of drivers are compared at the same consciousness level. This allows a driver with a low driving skill level to perform an action to safely avoid tailgating, whereas allowing a driver with a high driving skill level to quickly avoid tailgating.

The width of the road at the position to be set as the target pull-over point in accordance with the consciousness level or driving skill level of the driver can be set in advance in accordance with the criteria illustrated in FIG. 5. In a case where a pull-over space is located on the side of the road ahead of the vehicle 1, the assistance processing unit 65 may set the pull-over space as the target pull-over point. The pull-over space may be, for example, information stored in advance in the map data. Alternatively, the assistance processing unit 65 may detect a pull-over space located ahead in the traveling direction of the vehicle 1, based on the detection data transmitted from the surrounding environment sensor 31.

Then, the assistance processing unit 65 determines whether the distance from the vehicle 1 to the determined target pull-over point is equal to or less than a threshold (step S65). The threshold for the distance may be a preset value, or may be variable in accordance with the driving skill level of the driver. In a case where the driving skill level of the driver is high, the driver is able to execute a driving operation for pulling over the vehicle 1 to the target pull-over point even if the distance from the vehicle 1 to the target pull-over point is relatively short. Accordingly, the threshold for the distance is preferably set to be larger if the driving skill level of the driver is lower. This allows a driver with a low driving skill level to have sufficient time to perform an action to avoid tailgating, whereas allowing a driver with a high driving skill level to quickly avoid tailgating.

If the distance from the vehicle 1 to the determined target pull-over point is not equal to or less than the threshold (S65/No), the assistance processing unit 65 repeats the determination of step S65 until the distance from the vehicle 1 to the determined target pull-over point becomes equal to or less than the threshold. If it is determined that the distance from the vehicle 1 to the determined target pull-over point is equal to or less than the threshold (S65/Yes), the assistance processing unit 65 notifies the driver of the target pull-over point (step S67). In one example, the assistance processing unit 65 drives the HMI 43 to notify the driver that the vehicle has approached the target pull-over point within a predetermined distance. The assistance processing unit 65 may generate a preset notification sound, or may perform the notification by voice.

Then, the assistance processing unit 65 presents the traffic situation of the vehicle 1 to the driver (step S69). In one example, the assistance processing unit 65 drives the HMI 43 to display information on the target pull-over point ahead of the vehicle 1 and the distance from the vehicle 1 to the target pull-over point as an image and to notify the driver of the target pull-over point by voice.

Figure 10:
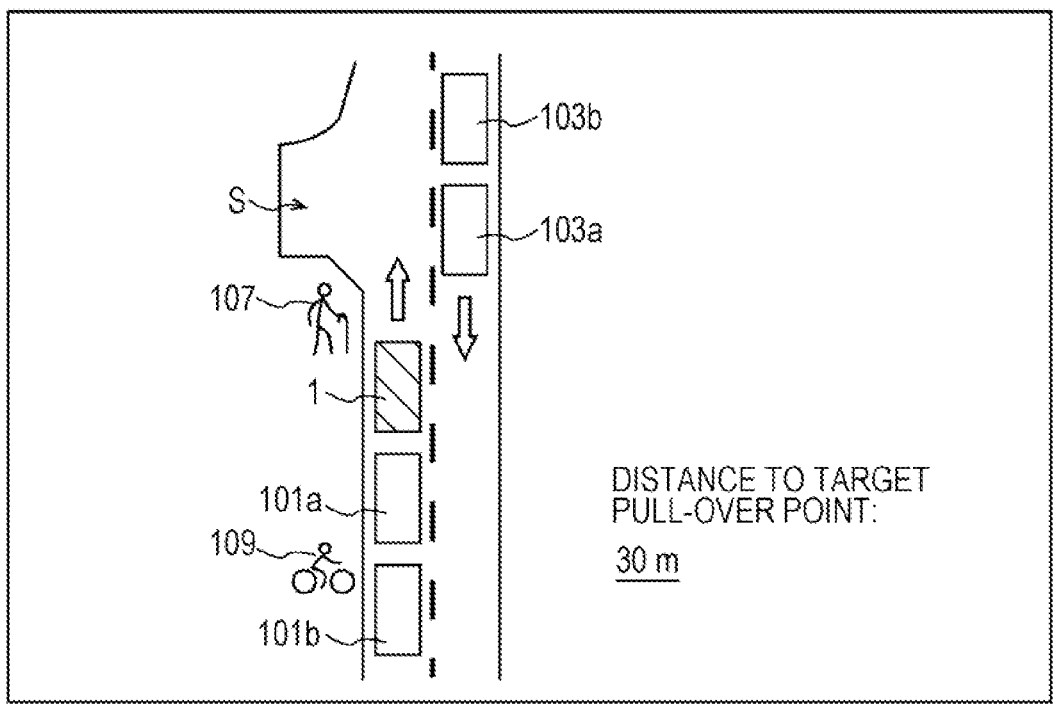
FIG. 10 is an explanatory diagram illustrating an example of an image displayed by the driving assistance apparatus according to the embodiment to notify the driver of a target pull-over point.

FIG. 10 illustrates an example of an image displayed to notify the driver of a target pull-over point S. In the example of the displayed image illustrated in FIG. 10, information on the target pull-over point S located ahead of the vehicle 1 is displayed together with text indicating the distance from the vehicle 1 to the target pull-over point S and icons of following vehicles 101*a* and 101*b*, oncoming vehicles 103*a* and 103*b*, a pedestrian 107, and a cyclist 109. Accordingly, the driver can identify the number of following vehicles 101*a* and 101*b* that the vehicle 1 blocks from passing. In addition, the driver can safely move the vehicle 1 to the target pull-over point S while paying attention to the pedestrian 107, the cyclist 109, and the oncoming vehicles 103*a* and 103*b*.

Then, the assistance processing unit 65 determines whether the vehicle 1 has approached the target pull-over point (step S71). Here, the assistance processing unit 65 determines whether the distance from the vehicle 1 to the target pull-over point is equal to or less than a second threshold set in advance to a value smaller than the threshold (first threshold) used in step S65. For example, the second threshold is set to a value in a range of 10 m to 20 m. The second threshold may be variable in accordance with the vehicle speed or the driving skill level of the driver.

If it is not determined that the vehicle 1 has approached the target pull-over point (S71/No), the assistance processing unit 65 repeats the determination of step S71 until it is determined that the vehicle 1 has approached the target pull-over point. If it is determined that the vehicle 1 has approached the target pull-over point (S71/Yes), the assistance processing unit 65 executes a pull-over guidance process for guiding the vehicle 1 toward the target pull-over point (step S73). The pull-over guidance process is executed by at least one of image display, audio output, or automatic driving control, for example. To execute the pull-over guidance process by image display or audio output, the assistance processing unit 65 outputs a drive signal to the HMI 43. To execute the pull-over guidance process by automatic driving control, the assistance processing unit 65 sets driving conditions such as a target steering angle and acceleration/deceleration of the vehicle 1, and transmits information on the driving conditions to the vehicle control device 41.

The details of the pull-over guidance process may differ depending on the driving skill level of the driver. For example, for a driver with a high driving skill level, the pull-over guidance process may be executed by at least one of image display or audio output. For a driver with a low driving skill level, the pull-over guidance process may be executed by automatic driving control in addition to at least one of image display or audio output. This allows a driver with a low driving skill level to safely move the vehicle 1 to the target pull-over point during driving of the vehicle 1.

When the assistance processing unit 65 is to execute the pull-over guidance process, the assistance processing unit 65 may notify a following vehicle of the start of a pull-over action. For example, the assistance processing unit 65 may turn on the hazard lights or brake lights of the vehicle 1. In a case where the vehicle 1 is capable of performing vehicle-to-vehicle communication with a following vehicle, the assistance processing unit 65 may notify the following vehicle of the start of a pull-over action or the distance from the vehicle 1 to the pull-over point via vehicle-to-vehicle communication.

Then, the traffic situation determination unit 63 determines the traffic situation of the vehicle 1 in a procedure similar to that in steps S17 to S19 (steps S75 to S77). Then, the assistance processing unit 65 determines whether the vehicle 1 has avoided tailgating (step S79). If the avoidance of tailgating has not been completed (S79/No), the assistance processing unit 65 returns to step S29 and executes the processing of the steps described above. On the other hand, if the avoidance of tailgating has been completed (S79/Yes), the assistance processing unit 65 ends the pull-over assistance process. Then, the process proceeds to step S33.

During execution of the pull-over assistance process, the pull-over assistance process may be stopped by the driver's intention. For example, the driver selects not to yield to the following vehicle. In this case, the driver may be able to give an instruction to stop the pull-over assistance process by means such as a switch, a touch panel, or audio input. Accordingly, the controller 51 stops the pull-over assistance process or all assistance processes for avoiding tailgating.

If the pull-over assistance process ends (S79/Yes) or if it is determined in step S29 that the driver himself/herself is able to perform the pull-over action (S29/Yes), the assistance processing unit 65 determines whether the in-vehicle system has stopped operating (Step S33). If the in-vehicle system has stopped operating (S33/Yes), the controller 51 ends the processing operation. On the other hand, if the in-vehicle system has not stopped operating (S33/No), the process returns to step S17. Then, the controller 51 executes the processing of the steps described above.

As described above, in response to a determination that the vehicle 1 is in a situation in which the vehicle 1 is being tailgated by a following vehicle, the driving assistance apparatus 50 according to this embodiment determines whether the driver of the vehicle 1 is aware of the passage obstruction situation, and sets an assistance operation for avoiding the passage obstruction situation, based on whether the driver is aware of the passage obstruction situation. Accordingly, in a case where the driver is not aware of the passage obstruction situation, the notification is promptly performed to the driver. In a case where the driver is aware of the passage obstruction situation, in contrast, the notification process is not performed. This can prevent a driver who is aware of the passage obstruction situation from being annoyed by the notification.

In a case where the driver is not aware of the passage obstruction situation, furthermore, the driving assistance apparatus 50 according to this embodiment sets an assistance operation for making the driver aware of the passage obstruction situation, based on the consciousness of the driver. In one example, in a case where the consciousness level of the driver is low, the driving assistance apparatus 50 generates a simple preliminary notification sound to raise the consciousness level to a predetermined degree. Additionally, the driving assistance apparatus 50 performs notification for making the driver aware of the passage obstruction situation. This makes it possible to prevent the behavior of the vehicle 1 from becoming unstable due to the driver being distracted by a sudden notification.

In a case where the driver is not aware of the passage obstruction situation, furthermore, the driving assistance apparatus 50 according to this embodiment sets an assistance operation for making the driver aware of the passage obstruction situation, based on the driving skill level in addition to the consciousness of the driver. In one example, if the driving skill level of the driver is lower, the driving assistance apparatus 50 notifies the driver at a higher consciousness level of being tailgated. This makes it possible to enhance the effect of preventing the behavior of the vehicle 1 from becoming unstable due to a driver with a low driving skill level being distracted by a sudden notification.

In a case where the driver is aware of the passage obstruction situation, the driving assistance apparatus 50 according to this embodiment sets an assistance operation for avoiding the passage obstruction situation when the driver himself/herself is not able to determine a driving operation for avoiding the passage obstruction situation.

Accordingly, in a case where the driver himself/herself is able to perform a driving operation for avoiding the passage obstruction situation, the execution of the assistance operation can be prevented. This can prevent a driver who is able to perform the avoidance operation from being annoyed by the assistance operation.

While a preferred embodiment of the disclosure has been described in detail with reference to the accompanying drawings, the disclosure is not limited to such an example. It will be apparent to a person having ordinary knowledge in the technical field to which the disclosure pertains that various changes and modifications may be made without departing from the technical scope defined by the appended claims, and it is to be understood that such changes and modifications also fall within the technical scope of the disclosure.

For example, in the embodiment described above, all of the functions of the driving assistance apparatus are mounted on a vehicle. However, the disclosure is not limited to such an example. For example, some of the functions of the driving assistance apparatus may be included in a server apparatus capable of communication via a mobile communication means. The driving assistance apparatus may transmit and receive data to and from the server apparatus. Furthermore, the driving assistance apparatus may be a server apparatus capable of communicating with a vehicle control device and an HMI that are on board a vehicle.

In the embodiment described above, a scene of the vehicle 1 being tailgated by a following vehicle has been described as an example. However, the disclosure is not limited to such an example. The technology of the disclosure can also be applied to a scene of traffic congestion occurring behind the vehicle 1. For example, when the vehicle 1 travels on an unfamiliar narrow road at a low speed, traffic congestion may occur behind the vehicle 1. In this case, the controller 51 acquires information on other vehicles via, for example, vehicle-to-vehicle communication. For example, if the vehicle 1 is followed by a preset number or more of following vehicles, the controller 51 determines that traffic congestion occurs behind the vehicle 1, and executes the recognition assistance process and the pull-over assistance process described above. Accordingly, even if the vehicle 1 causes traffic congestion, an assistance operation for avoiding the passage obstruction situation is set based on the awareness of the driver. The driver can yield to the following vehicles without being annoyed.

The technology of the disclosure can also be applied to a scene of an emergency vehicle approaching the vehicle 1 from behind. Even in this scene, an assistance operation for avoiding the passage obstruction situation is set based on the awareness of the driver. The driver can yield to the emergency vehicle without being annoyed.

REFERENCE SIGNS LIST

1: vehicle (subject vehicle), 31: surrounding environment sensor, 33: in-vehicle camera, 34: biometric sensor, 35: vehicle state sensor, 37: GPS sensor, 39: vehicle-to-vehicle communication unit, 40: navigation system, 41: vehicle control device, 50: driving assistance apparatus 51: controller, 53: memory, 61: driver determination unit, 62: acquisition unit, 63: traffic situation determination unit, 64: driver condition determination unit, 65: assistance processing unit, 71: driver database

The invention claimed is:

1. A driving assistance apparatus configured to assist driving of a vehicle, the driving assistance apparatus comprising:
one or more processors; and
one or more memories communicably coupled to the one or more processors,
the one or more processors being configured to execute a process including:
determining whether the vehicle is in a situation in which the vehicle is obstructing passage of a following vehicle;
when it is determined that the vehicle is in the situation in which the vehicle is obstructing passage of the following vehicle, determining whether a driver of the vehicle is aware of the situation;
when it is determined that the driver is aware of the situation, determining whether the driver is able to determine a driving operation for avoiding the situation; and
when it is not determined that the driver is able to determine the driving operation for avoiding the situation, setting a target pull-over point for avoiding the situation, based on consciousness of the driver and a width of a road on which the vehicle is traveling.

2. The driving assistance apparatus according to claim 1, wherein the one or more processors are configured to:
when the driver is not aware of the situation, set an assistance operation for making the driver aware of the situation, based on consciousness of the driver.

3. The driving assistance apparatus according to claim 2, wherein the one or more processors are configured to:
when the driver is not aware of the situation, set the assistance operation for making the driver aware of the situation, based on further a driving skill level of the driver.

4. The driving assistance apparatus according to claim 1, wherein the one or more processors are configured to:
determine whether the driver is performing a driving operation for moving the vehicle to the target pull-over point.

5. The driving assistance apparatus according to claim 1, wherein the one or more processors are configured to:
when the driver is not performing the driving operation for avoiding the situation, set the target pull-over point for avoiding the situation, based on further a driving skill level of the driver.

6. A driving assistance apparatus configured to assist driving of a vehicle, the driving assistance apparatus comprising:
a traffic situation determination unit configured to determine whether the vehicle is in a situation in which the vehicle is obstructing passage of a following vehicle;
a driver condition determination unit configured to, when it is determined that the vehicle is in the situation in which the vehicle is obstructing passage of the following vehicle, determine whether a driver of the vehicle is aware of the situation, and to, when it is determined that the driver is aware of the situation, determine whether the driver is able to determine a driving operation for avoiding the situation; and
an assistance processing unit configured to, when it is not determined that the driver is able to determine the driving operation for avoiding the situation, set a target pull-over point for avoiding the situation, based on consciousness of the driver and a width of a road on which the vehicle is traveling.

7. A non-transitory recording medium storing a computer program to be applied to a driving assistance apparatus for assisting driving of a vehicle, the computer program causing one or more processors to execute a process comprising:
- determining whether the vehicle is in a situation in which the vehicle is obstructing passage of a following vehicle;
- when it is determined that the vehicle is in the situation in which the vehicle is obstructing passage of the following vehicle, determining whether a driver of the vehicle is aware of the situation;
- when it is determined that the driver is aware of the situation, determining whether the driver is able to determine a driving operation for avoiding the situation; and
- when it is not determined that the driver is able to determine the driving operation for avoiding the situation, setting a target pull-over point for avoiding the situation, based on consciousness of the driver and a width of a road on which the vehicle is traveling.

* * * * *